Sept. 23, 1952    P. D. HEATH    2,611,861

AMPLITUDE COMPARISON CIRCUIT

Filed Nov. 26, 1948

Inventor:
Paul D. Heath,
by Claude A. Nott
His Attorney.

Patented Sept. 23, 1952

2,611,861

UNITED STATES PATENT OFFICE 2,611,861

AMPLITUDE COMPARISON CIRCUIT

Paul D. Heath, Syracuse, N. Y., assignor to General Electric Company, a corporation of New York Application November 26, 1948, Serial No. 62,174

3 Claims. (Cl. 250—27)

This invention relates to circuits responsive to the relative amplitudes of two characteristics of an electrical circuit, and more particularly to circuits responsive to the ratio of voltage to current in a high frequency alternating current transmission line of the concentric conductor or the wave guide type. It has for an object the provision of a circuit which responds accurately to changes in the relative amplitudes of two characteristics of a high frequency electrical circuit.

An amplitude comparison circuit which is accurately responsive to the ratio of two characteristics of a high frequency transmission line is an essential element of an automatic tuning system of the type disclosed in application Serial No. 62,173 of Julius Vahle and Paul D. Heath filed concurrently herewith, now Patent 2,523,791, issued September 26, 1950, which is assigned to the assignee of the present invention. Such an amplitude comparison circuit is also useful in any case where an indication of the instantaneous relation between two characteristics of an electrical circuit is desired or where it is desired to operate an instrument to provide a permanent record of the variations of the ratio of two such characteristics.

In carrying out my invention in one form, I insert a probe in a high frequency transmission line of the concentric conductor type to derive a signal voltage proportional to the transmission line voltage at that point. From a loop inserted in the same transmission line at the same point is derived a second signal voltage which is proportional to the current flowing therein. The two signal voltages are applied to an electron discharge rectifier device of the duo-diode type in series with a resistor. The output voltage of this device is proportional to the relative amplitudes of the voltage and the current in the high frequency transmission line.

Figure 1:
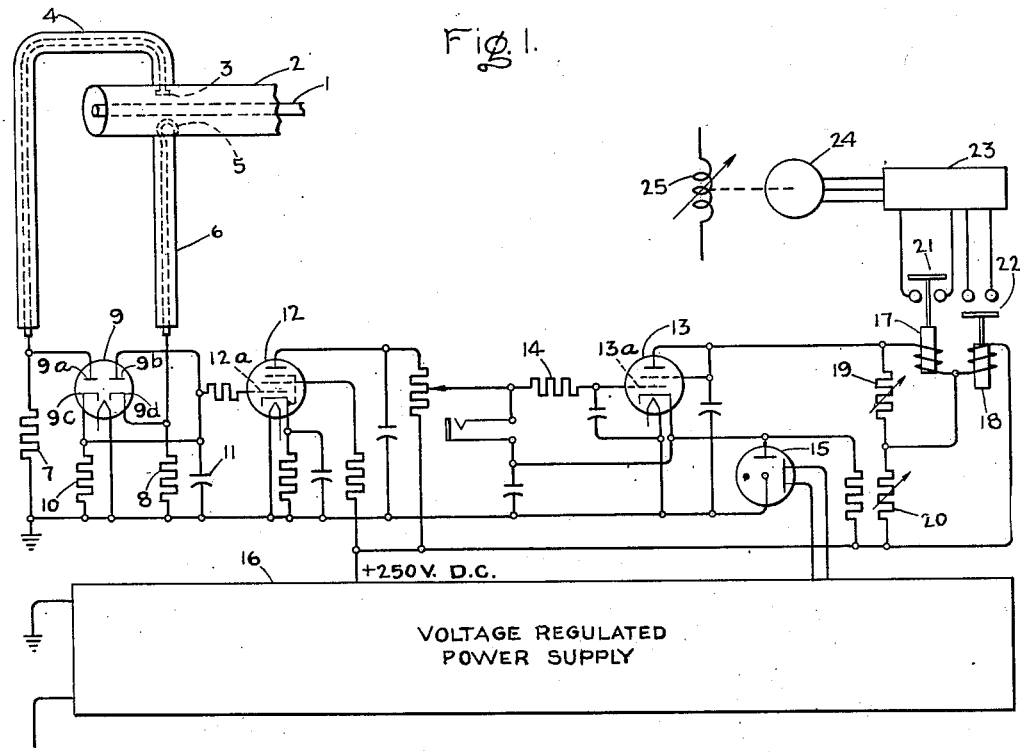
Figure 2:
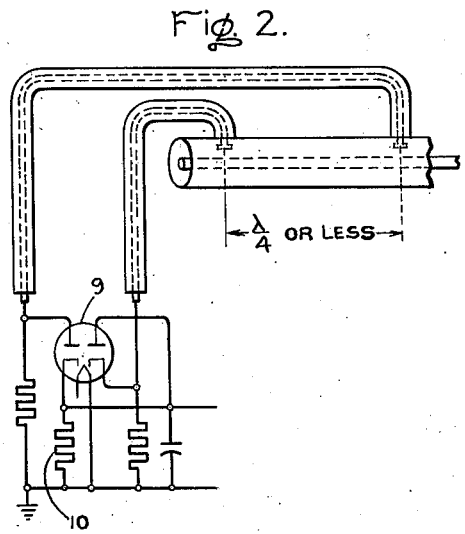

For a more complete understanding of my invention reference should be had to the accompanying drawing, Fig. 1 of which is an electrical circuit diagram of one embodiment of my invention while Fig. 2 is a schematic diagram of one modification thereof.

Referring to the drawing, there is shown a high frequency concentric conductor transmission line of the air dielectric type composed of center conductor 1 and outer tubular conductor 2. Inserted in the transmission line through elongated hollow outer conductor 2 is a probe 3 which serves as a potential divider between the center and outer conductors and derives a signal voltage which is proportional to the transmission line voltage at that point. The signal voltage from probe 3 is transmitted through a small concentric conductor 4 to an amplitude comparison circuit.

Also inserted in transmission line 1, 2 is a loop 5 from which, through its linkage with the electromagnetic field in the transmission line, is derived a signal voltage which is proportional to the current flowing therein. The signal voltage from loop 5 is transmitted through a small concentric conductor 6 to the amplitude comparison circuit.

Concentric conductor 4 is terminated in a resistor 7, the impedance of which is equal to the characteristic impedance of conductor 4 to minimize power reflections and standing waves on line 4. Conductor 6 is terminated in resistor 8, the impedance of which is equal to the characteristic impedance of conductor 6 to minimize power reflections and standing waves on line 6.

The signal voltage from probe 3 after transmission through conductor 4 is impressed on one anode 9a of a duo-diode electron discharge rectifier device 9. The signal voltage from loop 5 after transmission through conductor 6 is impressed on cathode 9d of the second diode of electron discharge device 9. The anode 9b of the second diode is connected to the cathode 9c of the first diode. Through the two diodes thus connected with opposite polarity the two signal voltages are applied to a common resistor 10 which is bypassed for radio frequency currents by capacitor 11. A net unidirectional voltage appears across resistor 10 which is proportional to the difference in amplitude of the signal voltages from probe 3 and loop 5 and hence is proportional to the relative amplitudes of the voltage and the current in transmission line 1, 2.

In utilizing my invention in one form, the output voltage appearing across resistor 10 may be impressed on the input electrode 12a of an electrode discharge device 12 which functions as a conventional amplifier. The output voltage of device 12 is in turn impressed on the control electrode 13a of an electron discharge device 13 through a voltage dropping resistor 14. The voltage from device 12 which is thus impressed on the grid of device 13 varies between predetermined positive unidirectional voltage limits. However, the cathode of device 13 is maintained at a fixed positive potential above ground by an electron discharge device 15 of the gas filled voltage regulating type. Thus, the output voltage of device 12 varies within predetermined negative and positive unidirectional voltage limits with respect to the cathode of device 13. This voltage is impressed on control electrode 13a of device 13 except that voltage dropping resistor 14 prevents the control electrode potential from becoming positive.

The anode circuit of device 13 is energized by connection with a conventional voltage regulated power source 16. The output voltage of device 13 may be used to operate solenoids 17 and 18. Variable rheostats 19 and 20 connected respectively in parallel with solenoids 17 and 18 provide adjustment of the relative currents in the two solenoids. Solenoids 17 and 18 operate respectively switches 21 and 22 which in turn operate reversible motor controller 23. Controller 23 governs the operation of a reversible motor 24 which in turn adjusts a variable inductance 25 which may, for example, be part of an automatic tuning system.

One modification of my invention is to use the output voltage appearing across resistor 10 to energize a conventional unidirectional current voltmeter calibrated to provide a direct indication of the relative amplitude of the voltage and current in transmission line 1, 2.

Another modification of my invention is illustrated in Fig. 2 of the accompanying drawing. In this modification two signal voltages are derived by two probes inserted in a high frequency transmission line and spaced apart by a distance not exceeding one quarter wave length of the high frequency energy being employed. Each of the signal voltages is proportional to the transmission line voltage at the point where its probe is inserted. These two signal voltages are applied to a duo-diode electron discharge device of the same type as device 9 in Fig. 1 in series with a resistor of the same type as resistor 10 in that figure. In this manner the ratio of the amplitudes of the voltages in the transmission line at these two points is determined. The relative amplitude of these two voltages is an indication of the standing wave ratio in the transmission line and hence an indication of whether the impedance of the load being supplied thereby is properly matched to the impedance of the transmission line.

Another modification of my invention is the use of two separate diodes instead of one duo-diode as described above and illustrated in Fig. 1. The two diodes may be of the electron discharge device type or they may be of the crystal, copper oxide, selenium, or other conventional type.

My invention provides an amplitude comparison circuit which is responsive to ratio only and is not sensitive to the power level in the electrical circuit with which it is used since any change in power level affects both signal voltage deriving devices to the same degree. Nor is my invention affected by frequency changes or changes in the phase angle between current and voltage in the transmission line because the resistor across which the output voltage of the duo-diode appears is bypassed by a radio frequency capacitor.

While I have illustrated and described one embodiment of my invention together with three modifications, many additional modifications will occur to those skilled in the art. It should therefore be understood that I intend to cover by the appended claims any such modifications as fall within the true spirit and scope of my invention.

What I claim as new and desire to secure by Letters Patent of the United States is:

1. An amplitude comparison circuit for a high frequency electrical transmission circuit comprising, a transmission line having an elongated hollow conductor, means including means within said hollow conductor for deriving a first signal voltage responsive to the amplitude of a first characteristic of said electrical circuit, a first concentric conductor transmission line for transmitting said first signal voltage, a first impedance substantially equal to the characteristic impedance of said first concentric conductor line for terminating said first concentric conductor line, means including means within said hollow conductor for deriving a second signal voltage responsive to the amplitude of a second characteristic of said electrical circuit, a second concentric conductor transmission line for transmitting said second signal voltage, a second impedance substantially equal to the characteristic impedance of said second concentric conductor line for terminating said second concentric conductor line, a common resistor connected for energization by both said signal voltages, and a pair of oppositely connected rectifier devices in circuit respectively with said two signal deriving means whereby the potential drops across said resistor due to the unidirectional currents produced therein by said two signal voltages are of opposite polarity, the net potential drop across said resistor being responsive to the relative amplitudes of said two characteristics of said electrical circuit.

2. An amplitude comparison circuit for a high frequency electrical transmission circuit comprising, a transmission line having an elongated hollow conductor, means including a probe extending into said hollow conductor for deriving a first signal voltage proportional to the voltage at a selected point on said transmission line, a first concentric conductor line having one end connected to said probe for transmitting said first signal voltage, a first impedance substantially equal to the characteristic impedance of said first concentric conductor line connected between the other end thereof and a source of reference potential, means including a loop positioned within said hollow conductor for deriving a second signal voltage proportional to the current at said selected point on said transmission line, a second concentric conductor line having one end connected to said loop for transmitting said second signal voltage, a second impedance substantially equal to the characteristic impedance of said second concentric conductor line connected between the other end of said line and said source of reference potential, a common resistor connected to said source of reference potential and arranged for energization by both said signal voltages, a capacitor connected in shunt with said common resistor for bypassing high frequency currents, a first half wave rectifier device having its anode connected to said other end of said first concentric conductor line and its cathode connected to said resistor, and a second half wave rectifier device having its anode connected to said resistor and its cathode connected to said other end of said second concentric conductor line, whereby the potential drops across said resistor due to the unidirectional currents produced therein by said two signal voltages are of opposite polarity, the net potential drop across said resistor being responsive to the relative amplitudes of voltage and current at said selected point on said transmission line.

3. An amplitude comparison circuit for a high frequency electrical transmission circuit comprising, a transmission line having an elongated hollow conductor, means including a probe extending into said hollow conductor for deriving a first signal voltage proportional to the voltage at a selected point on said transmission line, a first concentric conductor line for transmitting said first signal voltage, a first impedance substantially equal to the characteristic impedance of said first concentric conductor line for terminating said first concentric conductor line, means including a second probe extending into said hollow conductor for deriving a second signal voltage proportional to the voltage at a second selected point on said transmission line, a second concentric conductor line for transmitting said second signal voltage, a second impedance substantially equal to the characteristic impedance of said second concentric conductor line for terminating said second concentric conductor line, a common resistor connected for energization by both said signal voltages, and a pair of oppositely connected rectifier devices in circuit respectively with said two signal voltage deriving means whereby the potential drops across said resistor due to the unidirectional currents produced therein by said two signal voltages are of opposite polarity, the net potential drop across said resistor being responsive to the relative amplitudes of the voltages at said selected points on said transmission line.

PAUL D. HEATH.

REFERENCES CITED

The following references are of record in the file of this patent:

UNITED STATES PATENTS

| Number | Name | Date |
| --- | --- | --- |
| 2,402,083 | Reid | July 11, 1946 |
| 2,404,026 | Beard | July 16, 1946 |
| 2,413,913 | Duke | Jan. 7, 1947 |
| 2,413,939 | Benware | Jan. 7, 1947 |
| 2,442,606 | Korman | June 1, 1948 |
| 2,455,265 | Norgaard | Nov. 3, 1948 |

OTHER REFERENCES

"Hyper & Ultra-High Frequency Engineering" by Sarbacher & Edson: fourth printing, 1944 pages 100, 392, 394.